(12) United States Patent
Antony

(10) Patent No.: US 9,756,010 B2
(45) Date of Patent: Sep. 5, 2017

(54) RESOLVING NETWORK ADDRESS CONFLICTS

(71) Applicant: VMware, Inc., Palo Alto, CA (US)

(72) Inventor: Jinto Antony, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 591 days.

(21) Appl. No.: 14/042,370

(22) Filed: Sep. 30, 2013

(65) Prior Publication Data

US 2015/0095505 A1 Apr. 2, 2015

(51) Int. Cl.
*G06F 15/16* (2006.01)
*H04L 29/12* (2006.01)
*G06F 9/455* (2006.01)

(52) U.S. Cl.
CPC ...... *H04L 61/2007* (2013.01); *H04L 61/2046* (2013.01); *G06F 2009/45595* (2013.01); *H04L 61/103* (2013.01)

(58) Field of Classification Search
CPC .............. H04L 61/103; H04L 61/6022; H04L 29/12216; H04L 29/12264; H04L 29/12028; H04L 45/021; H04L 41/0843; H04L 41/0873; H04L 61/2046; H04L 61/2535; G06F 9/485; G06F 9/45533; G06F 9/45558
USPC ............ 709/221, 223, 226, 222; 370/395.54, 370/400, 389; 711/162; 718/1; 719/313
See application file for complete search history.

(56) References Cited

U.S. PATENT DOCUMENTS

| | | | | |
|---|---|---|---|---|
| 7,480,710 B1 * | 1/2009 | Olson | ............... | H04L 29/12264 709/223 |
| 8,151,263 B1 * | 4/2012 | Venkitachalam | ....... | G06F 9/485 711/162 |
| 2007/0097992 A1 * | 5/2007 | Singh | ............... | H04L 29/12216 370/395.54 |
| 2008/0205391 A1 * | 8/2008 | Suryaputra | ........... | H04L 45/021 370/389 |
| 2009/0183173 A1 * | 7/2009 | Becker | ................ | G06F 9/45533 719/313 |
| 2009/0198800 A1 * | 8/2009 | Dighe | ............... | H04L 29/12028 709/221 |
| 2011/0022694 A1 * | 1/2011 | Dalal | .................. | H04L 41/0843 709/222 |

(Continued)

OTHER PUBLICATIONS

Detection of duplicate IP addresses by Microsoft TCP/IP, Microsoft support, downloaded on Aug. 22, 2013 from http://support.microsoft.com/kb/120599, 5 pages.

(Continued)

*Primary Examiner* — Dustin Nguyen

(57) ABSTRACT

Exemplary systems and methods resolve an IP address conflict in a network system, including network systems in a virtual computing environment. An IP address monitor receives a message from a first device connected to a network or a second device connecting to the network. The message includes an indication of a network address conflict between the first and second devices. The IP address monitor detects the IP address conflict from the message, selects one of the first and second devices to disconnect from the network, and sends a message to disconnect the selected device from the network. A new IP address is received for the selected device, and the IP address monitor sends a message to reconnect the selected device to the network.

18 Claims, 4 Drawing Sheets

(56) References Cited

U.S. PATENT DOCUMENTS

| | | | |
|---|---|---|---|
| 2011/0202920 A1* | 8/2011 | Takase | G06F 9/45558 718/1 |
| 2012/0131197 A1* | 5/2012 | Prentice | H04L 61/103 709/226 |
| 2014/0044134 A1* | 2/2014 | Rajamanickam | H04L 61/6022 370/400 |

OTHER PUBLICATIONS

Resolving Duplicate IP Address Conflicts on a DHCP Network, Microsoft support, downloaded on Aug. 22, 2013 from http://support.microsoft.com/kb/133490, 3 pages.

Software-defined networking, Wikipedia, the free encyclopedia, downloaded on Aug. 22, 2013 from http://en.wikipedia.org/wiki/Software_Defined_Networking, 5 pages.

VirtuallyGhetto: Detecting a Duplicate IP Address for Your ESXi Hosts Using a vCenter Alarm, Jan. 28, 2013, downloaded at: http://www.virtuallyghetto.com/2013/01/detecting-duplicate-ip-address-for-your.html, 5 pages.

* cited by examiner

RESOLVING NETWORK ADDRESS CONFLICTS

FIELD OF THE INVENTION

The various embodiments described herein relate to resolving address conflicts in a network system. In particular, embodiments relate to resolving Internet Protocol ("IP") address conflicts in a network system, including network systems in a virtual computing environment.

BACKGROUND OF THE INVENTION

An IP address conflict, also termed "duplicate IP addresses", occurs when two computing systems connect to a network using the same IP address. For example, an IP address conflict arises when a first computer connecting to a network obtains an IP address from a dynamic host control protocol (DHCP) server, the same IP address has been statically assigned to a second computer, and the second computer connects to the network after the first computer. In another example, an IP address conflict in a virtual computing environment arises when a first virtual machine (VM) uses a statically assigned IP address and the first VM is cloned thereby generating a second VM having the same statically assigned IP address as the first VM. Then, one of the first and second VMs connects to a network, followed by the other of the first and second VMs connecting to the network, thereby generating an IP address conflict. An IP address conflict also arises when a user manually enters an IP address for a computing system connects to a network, and the manually entered IP address is already in use on the network. An IP address conflict also arises when there is some misconfiguration with DHCP server or because of multiple DHCP servers issuing same IP address to different virtual machines.

While some systems are able to detect an IP address conflict and generate a corresponding message, detecting and resolving an IP address conflict in a virtual computing environment is complicated for at least two reasons. First, a virtual computing environment may include a wide variety of host hardware and guest operating systems in addition to virtual networking elements that require IP addresses. Each physical or virtual machine (VM) within the virtual computing environment may use a different method of handling an IP address conflict. Second, cloning of VMs is a common activity in a virtualized environment for initial deployment of VM. The VM cloning process increases the likelihood of an IP address conflict.

SUMMARY OF THE INVENTION

Exemplary systems and methods resolve an IP address conflict in a network system, including network systems in a virtual computing environment. An IP address monitor receives a message from a first device connected to a network or a second device connecting to the network. The message includes an indication of a network address conflict between the first and second devices. The IP address monitor detects the IP address conflict from the message, selects one of the first and second devices to disconnect from the network, and sends a message to disconnect the selected device from the network. A new IP address is received for the selected device, and the IP address monitor sends a message to reconnect the selected device to the network.

Embodiments described herein resolve an IP address conflict in a virtual computing environment independently of particular hardware platforms or guest operating systems running on a host computer. In one embodiment, an IP address conflict is resolved without user intervention or user input. In another embodiment, an IP address conflict is resolved without powering off the device having the IP address conflict.

Other features and advantages will be apparent from the accompanying drawings and from the detailed description.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

Exemplary embodiments described herein resolve a duplicate IP address conflict using virtual switch reconfiguration. When a device powers up in a virtual computing environment, the device uses a statically assigned IP address or obtains an IP address from a DHCP server. The device sends a message to an IP address monitor that includes the IP address of the device. The IP address monitor maintains a list of all IP addresses connected to, and connecting to, the network. Upon receiving the message, the IP address monitor checks the IP address within the message against the IP address list maintained by the IP address monitor. The IP address monitor determines whether connecting the device to the network using the IP address in the message may generate an IP address conflict with another device. If an IP address conflict would be generated, the IP address monitor sends a message to a selected one of the two devices to resolve the IP address conflict by disconnecting the selected device from the network. The selected device obtains a new IP address and the IP address monitor reconnects the selected device to the network. In one embodiment, the IP address monitor uses a policy to determine which device is selected for disconnection.

Throughout the disclosure, the term "device" is used broadly to encompass both physical hardware and virtual computing elements. Physical hardware includes a desktop computer, laptop computer, tablet computer, personal digital assistant, cell phone, a server, IP phone, IP storage devices, network devices and other physical devices that connect to a network using a network address. Virtual computing elements include a virtual machine and a virtualization software layer, or hypervisor, running on a host computer. A virtualization software layer may run directly on a host computer, known as a "bare metal" hypervisor, or may run on a guest operating system, known as a "hosted" hypervisor. Virtual computing elements further include virtual network interface cards (vNICs), virtual switches running within a virtualization software layer, and other virtual networking elements that utilize an IP address. Thus, a client computer and a virtual machine are interchangeably referred to as a "device."

Throughout the disclosure, the term "IP address" has been used to exemplify the functionality disclosed herein. The disclosed functionality is equally applicable to Internet Protocol version 4, Internet Protocol version 6, and to any form of network addressing scheme that uniquely identifies a device on a network.

Figure 1:
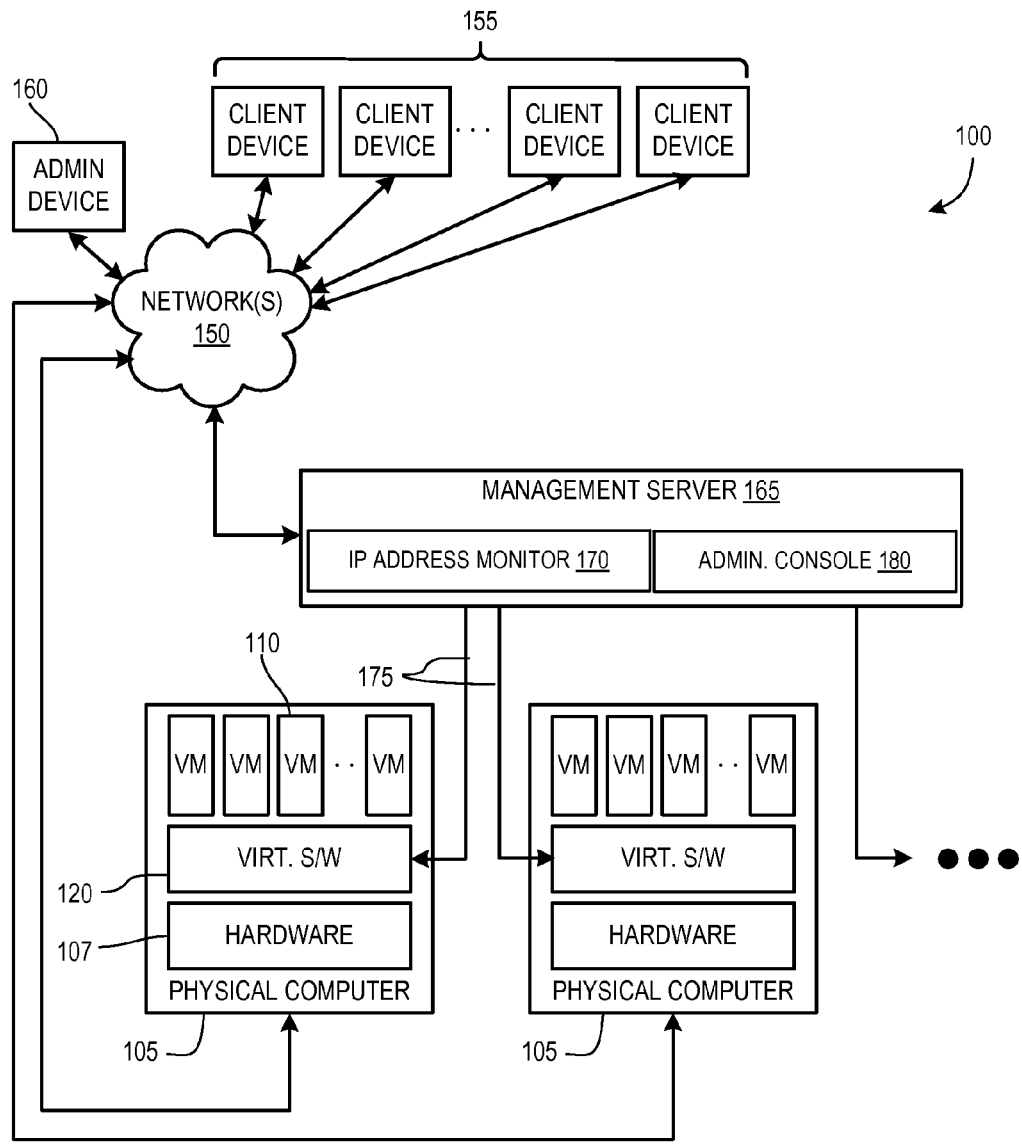
FIG. 1 illustrates, in block diagram form, an exemplary virtual computing infrastructure environment including one or more processing systems to resolve a network address conflict in response to a message from an IP address monitor.

FIG. 1 illustrates the elements of an exemplary virtual computing infrastructure (VCI) 100 including one or more processing systems 105. Each host processing system 105 includes hardware 107, virtualization software layer 120 (also referred to herein as a hypervisor), and one or more virtual machines (VMs) 110. VCI 100 allows client devices 155 to access centrally-managed user virtual desktops, such as those implemented by virtual machines (VM's) 110 running in a datacenter, via network(s) 150 (e.g., a local area network or other private or publically accessible wide area network, such as the Internet). For example, client device 155 and VM 110 use a desktop remoting protocol such as Remote Desktop Protocol (RDP), Virtual Network Computing (VNC), or Personal Computer over Internet Protocol (PCoIP) to remotely access/provide remote access to a virtual desktop generated by VM 110.

The term "desktop," as used herein, refers to a human interface environment through which users can launch, interact with, and manage applications, settings, and/or data, etc. A virtual desktop is a virtual computing system that operates as a desktop or workstation computer with which an end user can interact using desktop remoting protocol and the software and/or hardware of client device 155. A virtualized desktop may export user interfaces, e.g., keyboard and mouse input, audio and visual output, to client device 155 from VM 110 running remotely (in the datacenter) or locally on client device 155, or, in some cases, using a hybrid. Client device 155 transmits user input, e.g., keyboard or mouse input, to VM 110 to be processed, and receives display and other data, such as sound, from VM 110 for presentation to a user of client device 155. Client device 155 presents a bitmap representation of the desktop generated by VM 110. Inputs to and outputs from the virtualized desktop are reflected in the bitmap representation on client device 155 as it occurs on the virtualized desktop within VM 110.

VMs 110 are complete computation environments, containing virtual equivalents of the hardware and system software components of a physical system. For example, these virtual equivalents appear as a complete physical machine to a guest operating system running within VM 110. VMs 110 are typically implemented by an extensive virtualization infrastructure, which includes a variety of software and hardware components. Virtualization software layer 120 (e.g., a hypervisor) running on hardware 107 of host computer 105 manages one or more VMs 110. In one embodiment, virtualization software layer 120 may run on a guest operation system (not shown). Virtualization software layer 120 manages physical resources, e.g., hardware 107, as well as maintains virtual-to-physical hardware mappings.

Administrative device 160 also uses a desktop remoting protocol to access virtualization software layer 120 and VMs 110 on a host 105 remotely via network(s) 150. Within management server 165, administrative console 180 provides a remotely-accessible user interface to administrative device 160 to manage the configuration of virtual desktops and virtual services within the VCI 100. Exemplary virtual services include virtualized compute, networking, storage, and security services that implement VCI 100. A user of administrative device 160 is able to perform a plurality of functions such as: cloning VMs, configuring firewall and other networking/security services, adding servers, isolating multi-tenant organizations, creating datacenter service templates, defining role-based access, monitoring processor, memory, storage usage/allocation, monitoring networking resources, and other similar operations.

Management server 165 is coupled to host computers 105 via network(s) 150/175. In addition to administrative console 180, management server 165 further includes IP address monitor 170. As described further herein, IP address monitor 170 monitors the IP addresses of all devices present on network(s) 150 within VCI 100. If IP address monitor 170 detects a duplicate IP address on network(s) 150, IP address monitor 170 sends a message to virtualization software layer 120 of one, or both, of the devices that are using the IP address in conflict. The message notifies a user of a device, e.g. VM 110, that an IP address conflict has been detected between the device and another device (e.g. client device 155 or another VM 110).

While illustrated as a single component, in one embodiment, a plurality of servers, VMs, or other networked processing devices implement management server 165, IP address monitor 170, and administrative console 180.

Figure 2:
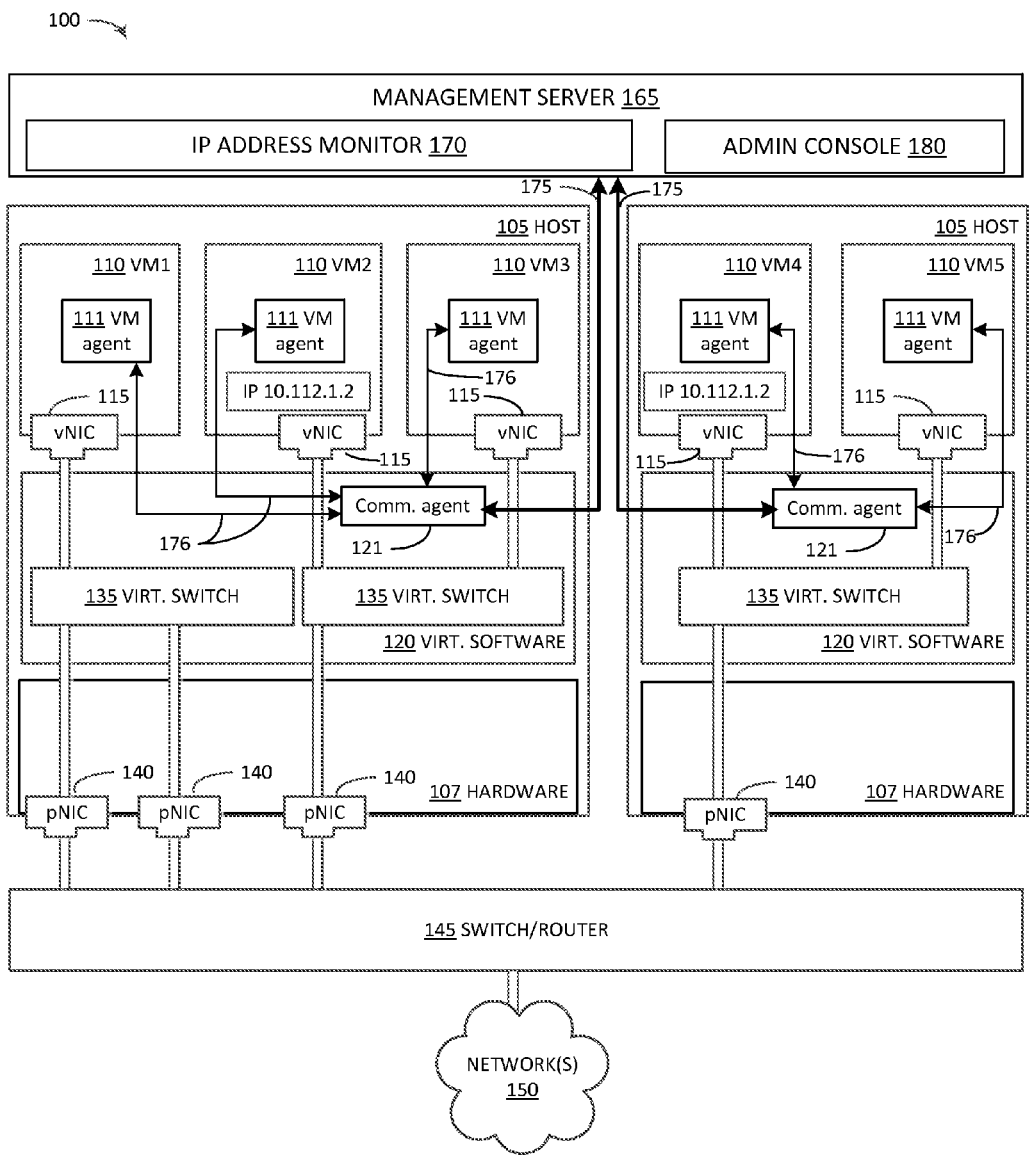
FIG. 2 illustrates, in block diagram form, a detailed view of exemplary host devices and management server within the virtual computing infrastructure environment.

FIG. 2 illustrates a detailed view of elements within hosts 105 in VCI 100. Each host 105 includes one or more VMs 110, such as VM1, VM2, VM3, VM4, and VM5. Each VM 110 includes one or more vNICs 115 coupled to virtual switch 135. When a first VM 110 powers on, vNIC 115 within VM 110 obtains an IP address, e.g. IP 10.112.1.2, as exemplified in VM2. A second VM 110 powering on may obtain the same IP address, as exemplified by VM4, resulting in an IP address conflict.

Host 105 includes hardware 107, such as memory, (e.g. ROM, RAM, mass storage, etc.), microprocessor(s), display controller(s) and I/O devices and interfaces (e.g. touch input, network interface, etc.) as described below with reference to FIG. 4.

Host 105 further comprises virtualization software layer 120. Virtualization software layer 120 includes and manages virtual switch 135. Virtual switch 135 is, in turn, coupled to one or more physical network interface cards (pNICs) 140 that are coupled to switch/router 145. Switch/router 145 is coupled to network(s) 150.

Virtualization software layer 120 further includes communication agent 121. Each VM 110 within host 105 includes VM agent 111. Each VM agent 111 establishes secure, trusted communication channel 176 with communication agent 121 that provides VM agent 111 with direct access to virtualization software layer 120. For example, VM 110 does not need an IP address for virtualization software layer 120 or other management solution to transmit a message or credentials to log in or otherwise authenticate the transmission of the message. In one embodiment, secure communication channel 176 is implemented using shared memory. VM agent 111 writes a message to the shared memory and communication agent 121/virtualization software layer 120 reads the message from the shared memory. The trusted communication channel enables VM agent 111 and communication agent 121 to send and receive messages to avoid or resolve an IP address conflict, e.g., before or while VM 110 is disconnected from virtual switch 135.

Management server 165 is communicatively coupled 175 to communication agent 121 in virtualization software layer 120 of host 105. In one embodiment, management server 165 is implemented by a VM 110, e.g. VM3. When management server 165 is implemented by a VM 110 having VM agent 111, management server 165 communicates with virtualization software layer 120 via secure communication channel 176 established between VM agent 111 and communication agent 121. In another embodiment, management server 165 is implemented as a processing system that is communicatively coupled 175 to communication agent 121 via network(s) 150, switch/router 145, pNIC 140, and virtualization software layer 120. Communication agent 121 is operably coupled to virtual switch 135 such that communication agent 121 is able to instruct virtualization software layer 120 to control virtual switch 135 to connect any vNIC to, or disconnect any vNIC from, any virtual switch 135 within virtualization software layer 120 on host 105.

IP address monitor 170 maintains a list of IP addresses of VMs and computing systems (first devices) connected to network(s) 150. IP address monitor 170 also monitors network(s) 150 to receive a message from each VM 110 or other computing system (second device) that is connecting to switches 135/145 or network(s) 150. Using the received message, IP address monitor 170 determines whether or not the first device and the second device have been assigned the same IP address. If IP address module 170 detects an IP address conflict between the first and second devices, IP address module 170 initiates the resolution of the IP address conflict. IP address monitor 170 may contain policy rules for resolving an IP address conflict. Exemplary embodiments of methods for resolving an IP address conflict are described below with reference to FIG. 3.

In one embodiment, IP address monitor 170 maintains a list of all devices and associated IP addresses that have accessed network(s) 150 using a statically assigned IP address, independent of the current connection status of any one of the devices. Before a device configured to use a statically assigned IP address connects to network(s) 150, the device sends a message containing the IP address of the device to IP address monitor 170. IP address monitor 170 compares the IP address in the message against the list of all devices and associated IP addresses that have accessed network(s) 150 using a statically assigned IP address. IP address monitor 170 sends a responsive message to the device indicating whether or not a conflict may occur if the device connects to network(s) 150. In another embodiment, before the device connects to network(s) 150, IP address monitor 170 additionally compares the IP address of the device against the list of all IP addresses currently in use on network(s) 150. IP address monitor 170 sends a responsive message to the device indicating whether or not an IP address conflict will occur if the device connects to network(s) 150.

Figure 3:
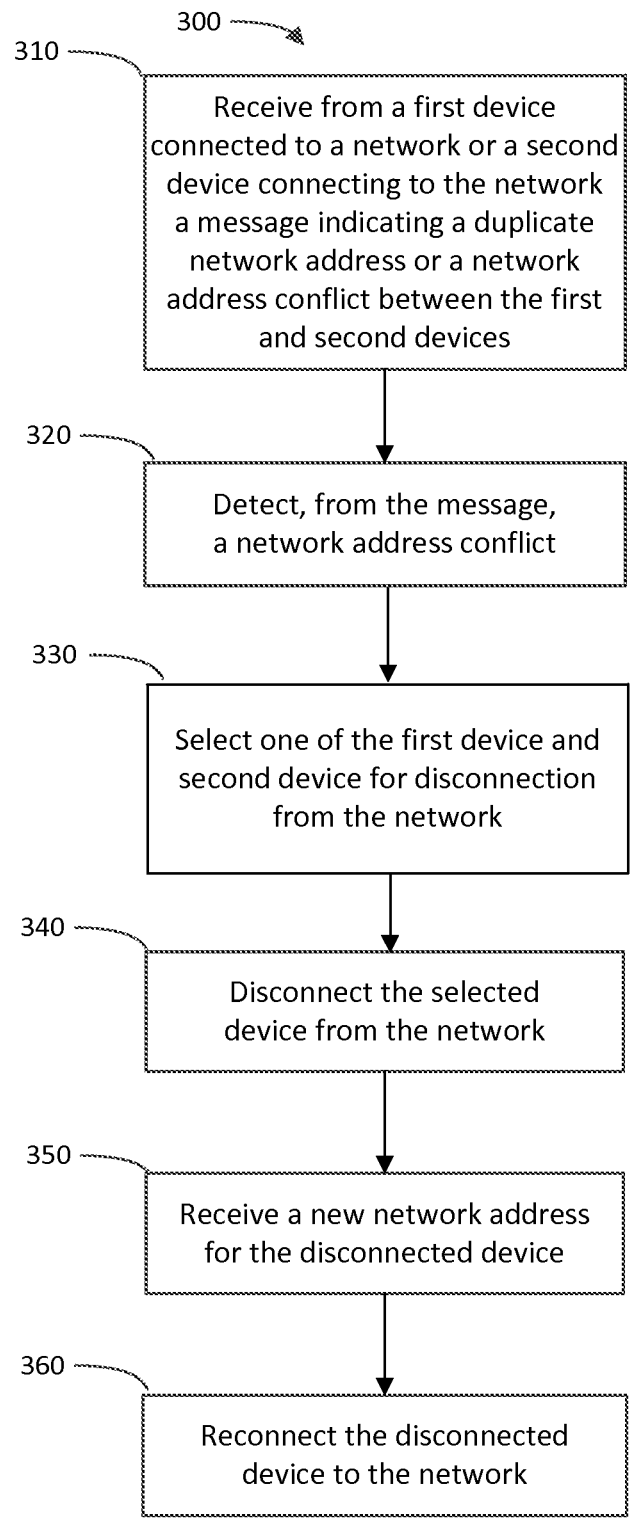
FIG. 3 is a flow chart illustrating an exemplary method of resolving a network address conflict using virtual switch reconfiguration.

FIG. 3 is a flow diagram illustrating exemplary method 300 of resolving an IP address conflict using virtual switch reconfiguration. In operation 310, IP address monitor 170 receives a message from a first device connected to a network or a second device connecting to a network. For example, as described above, VM agent 111 generates and sends the message to communication agent 121. In turn, communication agent 121 sends the message to IP address monitor 170. The message contains an indication of a duplicate network address or a network address conflict between the first and second devices. An indication of a duplicate network address or network address conflict may include the IP address in conflict or an identification of one or both of the first and second devices. In one embodiment, the message further includes an identifier of the device sending the message.

In operation 320, IP address monitor 170 detects an IP address conflict from the message. IP address monitor 170 maintains a list of IP addresses of all devices connected or connecting to the network. In one embodiment, detecting an IP address conflict by the IP address monitor 170 includes checking the IP address in the received message against the list of IP addresses to determine whether the IP address in the message is already in use on the network. In another embodiment, IP address monitor 170 maintains a list of all devices and associated IP addresses that have accessed network(s) 150 using a statically assigned IP address, independent of the current connection status of any one of the devices. In such an embodiment, detecting an IP address conflict includes comparing the IP address in the received message against the list of all devices and associated IP addresses that have accessed network(s) 150 using a statically assigned IP address to determine whether or not the IP address in the message may generate a conflict. Alternatively, detecting an IP address conflict from the message includes reading the indication of an IP address conflict from the message. For example, a guest operating system of a VM 110 may generate and send a message in response to receiving an Address Resolution Protocol (ARP) message from another device and determining from the ARP message that the other device is using the same IP address as the VM 110.

In operation 330, IP address monitor 170 selects one of the first and second devices for disconnection from the network. In one embodiment, IP address monitor 170 selects the last of the first and second devices to connect to the network using the IP address for disconnection from the network. In another embodiment, IP address monitor 170 identifies the first and second devices and uses the device identities to apply a policy to determine which device to select for disconnection from the network.

Identification of devices may be by any logical scheme that results in a unique identification of a device. In one embodiment, a device is identified by a MAC address. In another embodiment, IP address monitor 170 generates a device identifier from computing entity identifiers such as a combination of one or more of an identifier of host 105, virtual switch 135, vNIC 115 and VM 110. In yet another embodiment, a device identifier is generated from a combination of computing entities and user identifiers, such as a combination of one or more of an identifier of a company, a department, a user identifier, host computer 105, and VM 110. In one embodiment, device identifiers are associated with a priority level for the device. Alternatively, one or more device identifiers are mapped to a list of devices or groups of devices that may be disconnected or may not be disconnected from the network when an IP conflict occurs. IP address monitor 170 applies the policy to select which device, as between the first and second devices, to disconnect from the network.

In one embodiment, the policy to select a device for disconnection from the network includes maintaining connection to the network of the first device (in time) connected to the network and selecting the second device (connected to the network subsequent to the first device) for disconnection from the network. In another embodiment, the policy to select a device for disconnection from the network includes maintaining the connection of the device having a higher priority, as between the first and second devices, and selecting the device having lower priority for disconnection from the network. In yet another embodiment, the policy selects a device for disconnection from the network if the device is a cloned VM having a statically assigned IP address.

In operation 340, IP address monitor 170 sends a message to virtualization software layer 120 of the device selected for disconnection to reconfigure virtual switch 135 to disconnect the selected device from the network. In one embodiment, virtualization software layer 120 sends a message to a user interface of the selected device indicating that the device has been disconnected from the network due to an IP address conflict. When the selected device is VM 110, the message is sent via secure communications channel 176 described above. Virtualization software layer 120 disconnects the selected device by reconfiguring virtual switch 135 to disconnect the device/vNIC 115.

In operation 350, IP address monitor 170 monitors the disconnected device for receipt of a message that includes a new IP address for the disconnected device. The disconnected device may receive a new IP address by manual entry of a new static IP address by either a user of the disconnected device or from a user of administrative device 160. Alternatively, the disconnected device may obtain a new IP address by being reconfigured to use DHCP to obtain an IP address. In one embodiment, the disconnected device is reconfigured to use DHCP by virtualization software layer 120 either by default or in response to a message from IP address monitor 170. In another embodiment, a user of the disconnected device may reconfigure the device to use DHCP. In yet another embodiment, a user is prompted whether the device is to be reconfigured to use DHCP or the user will resolve the IP address conflict by entering a new IP address. The disconnected device maintains communication with virtualization software layer 120, and thereby with IP address monitor 170, via secure communications channel 176 between VM agent 111 and communications agent 121. After the disconnected device has been reconfigured to use DHCP, an IP renew command is issued to obtain a new IP address for the disconnected device. The IP renew command may be entered by a user of the reconfigured device, by a user of administrative device 160, or under control of virtualization software layer 120 via secure communication channel 176. Virtualization software layer 120 sends a message containing the new IP address to IP address monitor 170. IP address monitor 170 checks the new IP address against the list of IP addresses maintained by IP address monitor 170.

If the new IP address does not generate a conflict, then in operation 360, IP address monitor 170 sends a message to virtualization software layer 120 to reconfigure virtual switch 135 to reconnect the disconnected device to the network. In the event that the new IP address generates a second IP address conflict, operation 350 may be repeated before reconnecting the disconnected device to the network in operation 360. The new IP address is added to the list of IP address maintained by IP address monitor 170.

Figure 4:
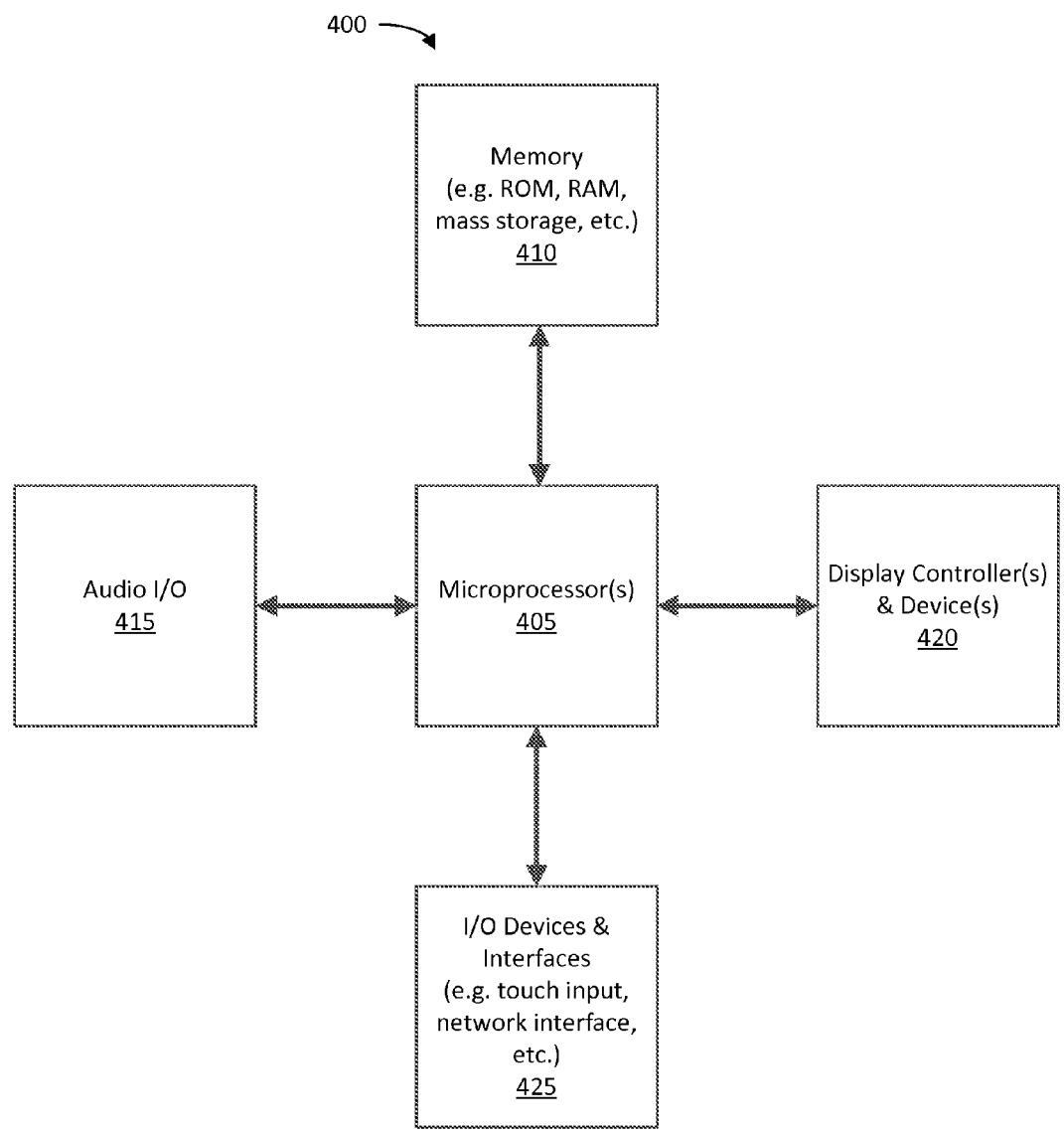
FIG. 4 illustrates, in block diagram form, an exemplary processing system to resolve a network address conflict.

FIG. 4 illustrates, in block diagram form, exemplary processing system 400 to resolve a network address conflict. Processing system 400 is an exemplary representation of one or more of client device 155, administrative device 160, host computer 105, management server 165, IP address monitor 170, and administrative console 180. Processing system 400 includes memory 410, which is coupled to microprocessor(s) 405. Memory 410 may be used for storing data, databases, metadata, and programs for execution by the microprocessor(s) 405. Memory 410 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 410 may be internal or distributed memory.

Processing system 400 also includes one or more input or output ("I/O") devices and interfaces 425 which are provided to allow a user to provide input to, receive output from, and otherwise transfer data to and from the system. I/O devices 425 may include a mouse, keypad or a keyboard, a touch panel or a multi-touch input panel, camera, optical scanner, network interface, modem, other known I/O devices or a combination of such I/O devices. I/O devices and interfaces 425 may also include a port, connector for a dock, or a connector for a USB interface, FireWire, Thunderbolt, Ethernet, Fibre Channel, etc. to connect the processing system 400 with another device, external component, or a network. Exemplary I/O devices and interfaces 425 also include wireless transceivers, such as an IEEE 802.11 transceiver, an infrared transceiver, a Bluetooth transceiver, a wireless cellular telephony transceiver (e.g., 2G, 3G, 4G, etc.), or another wireless protocol to connect processing system 400 with another device, external component, or a network and receive stored instructions, data, tokens, etc. It will be appreciated that one or more buses, may be used to interconnect the various components described above.

Processing system 400 also includes database(s) 415, which may include dedicated high-speed storage devices, a disk array, database management software, an indexer, and database optimization tools. Database(s) 415 are coupled to microprocessor(s) 405 and, thereby, to I/O devices and interfaces 425 including, e.g., a network interface coupled to a network (not shown). In one embodiment, database(s) 415 may be used by management server 165 and IP address monitor 170 to store device identifiers, an IP address list, and IP address conflict resolution policies as described above with reference to FIG. 3. Remote users, such as administrative device 160, are able to access the database(s) 415 via network access. Display controller and display device 420 provides a visual user interface for the user.

Processing system 400 may be a personal computer, tablet-style device, a personal digital assistant (PDA), a cellular telephone with PDA-like functionality, a Wi-Fi based telephone, a handheld computer which includes a cellular telephone, a media player, an entertainment system, or devices which combine aspects or functions of these devices, such as a media player combined with a PDA and a cellular telephone in one device. In other embodiments, processing system 400 may be a network computer, server, or an embedded processing device within another device or consumer electronic product. As used herein, the terms computer, device, system, processing system, processing device, and "apparatus comprising a processing device" may be used interchangeably with processing system 400 and include the above-listed exemplary embodiments.

It will be appreciated that additional components, not shown, may also be part of processing system 400, and, in certain embodiments, fewer components may also be used in processing system 400. It will be apparent from this description that aspects of the inventions may be embodied, at least in part, in software. That is, the computer-implemented method of FIG. 3 may be carried out in a processing system 400 in response to its processor(s) or processing system executing sequences of instructions contained in a memory or other non-transitory machine-readable storage medium. The software may further be transmitted or received over a network (not shown) via network interface device 425. In various embodiments, hardwired circuitry may be used in combination with the software instructions to implement the present embodiments. Thus, the techniques are not limited to any specific combination of hardware circuitry and software, or to any particular source for the instructions executed by processing system 400.

The instructions executed by the processing system may be embodied in a non-transitory computer-readable medium including an article of manufacture. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of non-transitory machine-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

It will be evident that various modifications may be made thereto without departing from the broader spirit and scope of the invention as set forth in the following claims. For example, the methods described herein may be performed with fewer or more features/blocks or the features/blocks may be performed in differing orders. Additionally, the methods described herein may be repeated or performed in parallel with one another or in parallel with different instances of the same or similar methods.

What is claimed is:

1. A computer-implemented method comprising:
receiving a message from a first device connected to a network or a second device connecting to the network, wherein the second device has a network address that is a duplicate of a network address of the first device, and wherein the message includes the duplicate network address or an indication of a conflict resulting from the duplicate network address;
detecting, from the message, a network address conflict between the first device and the second device;
selecting and disconnecting one of the first device and the second device from the network in response to detecting the conflict, wherein the selected one of the first device and the second device is disconnected from the network, wherein the selected and disconnected one of the first device and the second device comprises a disconnected device, and wherein the disconnected device is a virtual machine running within a host device;
receiving a new network address for the disconnected device, the new network address received from the disconnected device via a secure communication channel between the disconnected device and virtualization software of the host device, the secure communication channel being independent of a networking stack of the disconnected device; and
reconnecting the disconnected device to the network using the new network address in response to determining that the new network address does not conflict with a network address of another device connected to the network.

2. The method of claim 1, further comprising:
maintaining a list of network addresses of devices connected to the network and wherein detecting the network address conflict comprises comparing the duplicate network address to the list.

3. The method of claim 1, wherein the network comprises a virtual switch implemented within the host device.

4. The method of claim 3, wherein the disconnecting and the reconnecting of the disconnected virtual machine include causing, in response to detecting the conflict, the virtual switch to perform the disconnecting and reconnecting.

5. The method of claim 1, wherein the selecting is performed in accordance with a policy, the policy comprising one of: selecting the second device due to the second device connecting to the network later in time than the first device and selecting the one of the first device and the second device having a lower priority.

6. The method of claim 1, wherein the selecting is performed in accordance with a policy, the policy comprising selecting the one of the first device and the second device that is a cloned virtual machine having a statically assigned IP address.

7. The method of claim 1, further comprising:
determining that the disconnected device was configured with a static network address;
configuring the disconnected device to obtain a new network address dynamically in response to detecting the conflict and the determination that the disconnected device was configured with a static network address; and
causing the disconnected device to request an address server to assign the disconnected device a new network address, wherein the new network address is received by the disconnected device in response to the request.

8. A non-transitory computer-readable medium programmed with executable instructions that, when executed, implement a method comprising:
receiving a message from a first device connected to a network or a second device connecting to the network, wherein the second device has a network address that is a duplicate of a network address of the first device, and wherein the message includes the duplicate network address or an indication of a conflict resulting from the duplicate network address;
detecting, from the message, a network address conflict between the first device and the second device;
selecting and disconnecting one of the first device and the second device from the network in response to detecting the conflict, wherein the selected one of the first device and the second device is disconnected from the network, wherein the selected and disconnected one of the first device and the second device comprises a disconnected device, and wherein the disconnected device is a virtual machine running within a host device;
receiving a new network address for the disconnected device, the new network address received from the disconnected device via a secure communication channel between the disconnected device and virtualization software of the host device, the secure communication channel being independent of a networking stack of the disconnected device; and reconnecting the disconnected device to the network using the new network address in response to determining that the new network address does not conflict with a network address of another device connected to the network.

9. The computer readable medium of claim 8, further comprising:

maintaining a list of network addresses of devices connected to the network and wherein detecting the network address conflict comprises comparing the duplicate network address to the list.

10. The computer readable medium of claim 8, wherein the network comprises a virtual switch implemented within the host device.

11. The computer readable medium of claim 10, wherein the disconnecting and the reconnecting of the disconnected virtual machine include causing, in response to detecting the conflict, the virtual switch to perform the disconnecting and reconnecting.

12. The computer readable medium of claim 8, wherein the selecting is performed in accordance with a policy, the policy comprising one of: selecting the second device due to the second device connecting to the network later in time than the first device and selecting the one of the first device and the second device having a lower priority.

13. The computer readable medium of claim 8, wherein the selecting is performed in accordance with a policy, the policy comprising selecting the one of the first device and the second device that is a cloned virtual machine having a statically assigned IP address.

14. The computer readable medium of claim 8, further comprising:

determining that the disconnected device was configured with a static network address;

configuring the disconnected device to obtain a new network address dynamically in response to detecting the conflict and the determination that the disconnected device was configured with a static network address; and causing the disconnected device to request an address server to assign the disconnected device a new network address, wherein the new network address is received by the disconnected device in response to the request.

15. A system, comprising:

a processing device programmed with executable instructions that, when executed, perform a method comprising:

receiving a message from a first device connected to a network or a second device connecting to the network, wherein the second device has a network address that is a duplicate of a network address of the first device, and wherein the message includes the duplicate network address or an indication of a conflict resulting from the duplicate network address;

detecting, from the message, a network address conflict between the first device and the second device;

selecting and disconnecting one of the first device and the second device from the network in response to detecting the conflict, wherein the selected one of the first device and the second device is disconnected from the network, wherein the selected and disconnected one of the first device and the second device comprises a disconnected device, and wherein the disconnected device is a virtual machine running within a host device;

receiving a new network address for the disconnected device, the new network address received from the disconnected device via a secure communication channel between the disconnected device and virtualization software of the host device, the secure communication channel being independent of a networking stack of the disconnected device; and reconnecting the disconnected device to the network using the new network address in response to determining that the new network address does not conflict with a network address of another device connected to the network.

16. The system of claim 15, further comprising:

maintaining a list of network addresses of devices connected to the network and wherein detecting the network address conflict comprises comparing the duplicate network address to the list.

17. The system of claim 15, wherein the network comprises a virtual switch implemented within the host device.

18. The system of claim 17, wherein the disconnecting and the reconnecting of the disconnected virtual machine include causing, in response to detecting the conflict, the virtual switch to perform the disconnecting and reconnecting.

* * * * *